United States Patent
Kaltenbach et al.

(10) Patent No.: US 8,814,750 B2
(45) Date of Patent: Aug. 26, 2014

(54) METHOD AND DEVICE FOR CONTROLLING A CREEP MODE OF A VEHICLE COMPRISING A HYBRID DRIVE

(75) Inventors: Johannes Kaltenbach, Friedrichshafen (DE); Stefan Wallner, Mattsee (AT)

(73) Assignee: ZF Friedrichshafen AG, Friedrichshafen (DE)

( * ) Notice: Subject to any disclaimer, the term of this patent is extended or adjusted under 35 U.S.C. 154(b) by 286 days.

(21) Appl. No.: 12/747,145
(22) PCT Filed: Dec. 2, 2008
(86) PCT No.: PCT/EP2008/066586
§ 371 (c)(1),
(2), (4) Date: Nov. 4, 2010
(87) PCT Pub. No.: WO2009/074484
PCT Pub. Date: Jun. 18, 2009

(65) Prior Publication Data
US 2011/0045947 A1 Feb. 24, 2011

(30) Foreign Application Priority Data
Dec. 13, 2007 (DE) .................. 10 2007 055 785

(51) Int. Cl.
| B60W 10/02 | (2006.01) |
| B60W 30/188 | (2012.01) |
| B60W 10/08 | (2006.01) |
| B60W 20/00 | (2006.01) |
| B60W 30/18 | (2012.01) |
| B60K 6/48 | (2007.10) |
| B60W 30/184 | (2012.01) |
| B60W 30/186 | (2012.01) |

(52) U.S. Cl.
CPC ..... *B60W 30/18063* (2013.01); *B60W 30/1846* (2013.01); *B60W 30/188* (2013.01); *B60W 30/186* (2013.01); *B60W 10/08* (2013.01); *B60W 20/102* (2013.01); *Y02T 10/6221* (2013.01); *Y02T 10/7258* (2013.01); *B60K 6/48* (2013.01); *B60W 10/02* (2013.01)
USPC .......................................................... 477/5

(58) Field of Classification Search
USPC ....................................... 477/5, 98
See application file for complete search history.

(56) References Cited

U.S. PATENT DOCUMENTS

| 6,808,470 B2 | 10/2004 | Boll |
| 6,851,705 B2 * | 2/2005 | Young et al. .................. 280/729 |

(Continued)

FOREIGN PATENT DOCUMENTS

| DE | 10158536 A1 | 7/2003 |
| DE | 102005051382 A1 | 5/2007 |
| DE | 102006003714 A1 | 8/2007 |
| EP | 1862364 A1 | 12/2007 |
| WO | WO 2007/085367 A1 | 8/2007 |

OTHER PUBLICATIONS

International Search Report for International Application No. PCT/EP2008/066586, dated Jun. 19, 2009, 2 pages.

(Continued)

*Primary Examiner* — Saul Rodriguez
*Assistant Examiner* — David J Hlavka
(74) *Attorney, Agent, or Firm* — Brinks Gilson & Lione

(57) ABSTRACT

The invention relates to a method for controlling a creep mode of a vehicle comprising a hybrid drive (1), a drive train (2) which essentially comprises an internal combustion engine (3), an electric machine (5), a gear-shift element (4) arranged between the internal combustion engine (3) and the electric machine (5), a transmission (7) and a power take-off (26). The aim of the invention is to allow an efficient creep mode which is substantially temporally unlimited and reliable and wherein an electrical energy storage device (14) is used as little as possible. The method according to the invention is characterized in that primarily the gear-shift element (4) is used when the internal combustion engine (3) is running and secondarily, depending on a monitoring of defined operation parameters of the gear-shift element (4) and/or of variables relevant for the creep mode, the electric machine (5) is used to implement the creep mode. A device for carrying out the method comprises control and monitoring means (21, 22, 25, 27) which are used for producing a creep torque, taking into consideration an admissible load of the gear-shift element (4), primarily by operating the gear-shift element (4) in a slip mode and secondarily by operating the electric machine (5) in a creep mode.

10 Claims, 1 Drawing Sheet

(56) References Cited

U.S. PATENT DOCUMENTS

| | | | |
|---|---|---|---|
| 7,472,769 | B2 | 1/2009 | Yamanaka et al. |
| 7,644,790 | B2 * | 1/2010 | Roske et al. ............... 180/65.22 |
| 2004/0112652 | A1 * | 6/2004 | Esposito Corcione et al. ............... 180/65.2 |
| 2005/0221947 | A1 | 10/2005 | Mesiti et al. |
| 2007/0272456 | A1 | 11/2007 | Shiiba |
| 2009/0143189 | A1 * | 6/2009 | Hasegawa et al. ............... 477/5 |
| 2011/0021312 | A1 * | 1/2011 | Fukitani ............... 477/5 |
| 2012/0108385 | A1 * | 5/2012 | Sano et al. ............... 477/5 |

OTHER PUBLICATIONS

Written Opinion of the International Searching Authority for International Application No. PCT/EP2008/066586, dated Jun. 19, 2009, 5 pages.

International Preliminary Report on Patentability for International Application No. PCT/EP2008/066586, dated , 6 pages.

Search Report dated Mar. 14, 2013 for German Application No. 10 2007 055 785.1, including Translation of Section C, 7 pages.

* cited by examiner

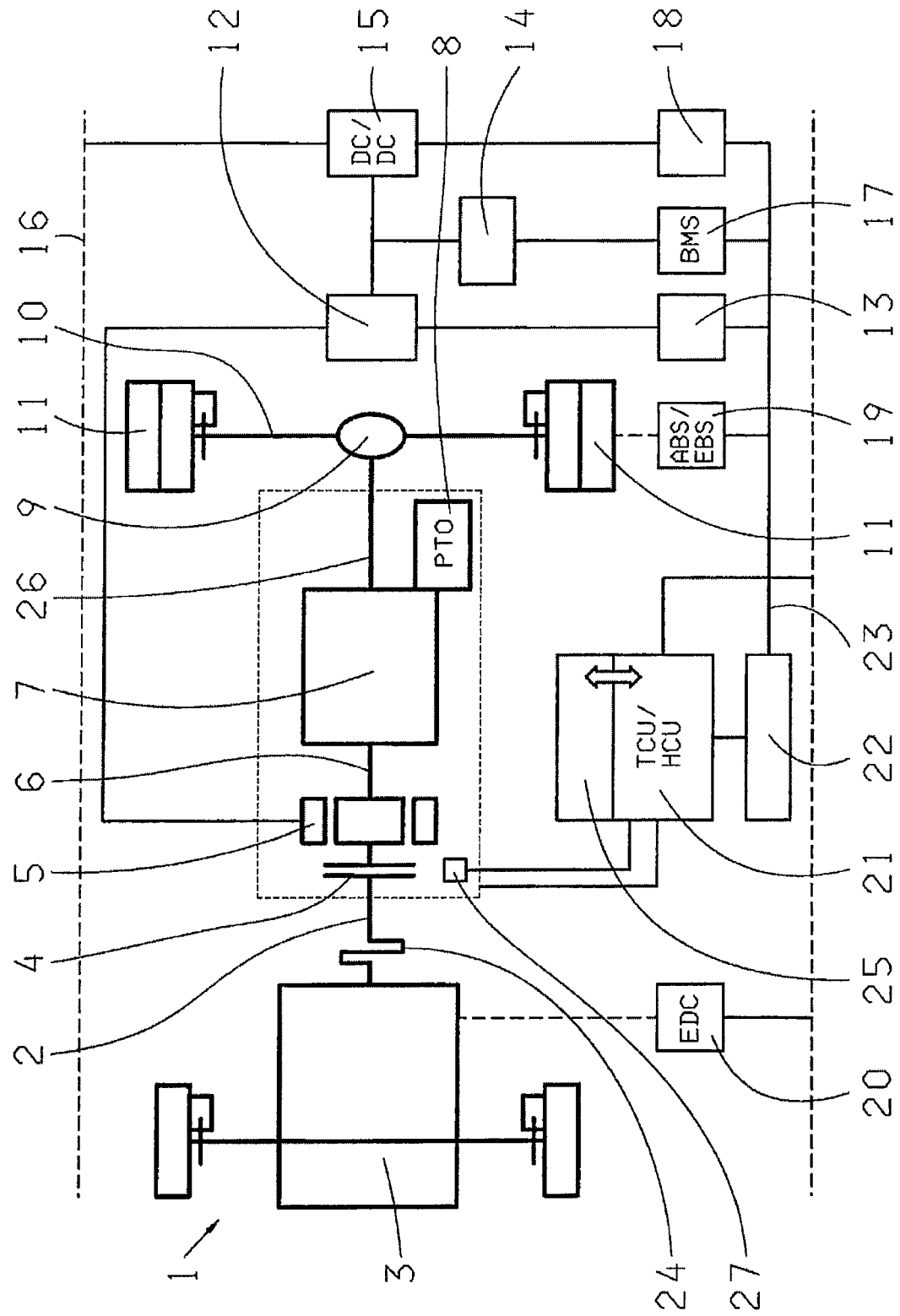

METHOD AND DEVICE FOR CONTROLLING A CREEP MODE OF A VEHICLE COMPRISING A HYBRID DRIVE

This application is a filing under 35 U.S.C. §371 of International Patent Application PCT/EP2008/066586, filed Dec. 2, 2008, which claims priority to German Application No. 10 2007 055 785.1, filed Dec. 13, 2007, each of which is incorporated by reference herein in its entirety.

The invention concerns a process and a device for controlling a creep mode of a vehicle with a hybrid engine in accordance with the preamble of the patent claim 1, or respectively, the patent claim 7.

Hybrid engines are becoming increasingly significant in the motor vehicle industry due to their potential for decreasing exhaust emissions and energy consumption. These types of vehicles have a variety of power sources, whereby in particular, combinations of internal combustion engines and electric motors have an advantage, as on the one hand they have the long range capacity and performance advantages of internal combustion engines, and on the other hand are able to make use of the flexible application possibilities of electric machines as the sole or supplementary power source or as starter generator as well as a generator for power and recuperation.

The market demands of hybrid power trains that they are able to be implemented in the vehicle with as little additional space requirements as possible, be as uncomplicated as possible and that they are inexpensive and have a simple construction. For this, there are basically two hybrid designs, the serial hybrid and the parallel hybrid. Configurations of this sort are already known, and are constantly being improved.

With a serial hybrid, the engines are in a sequential circuitry. In this case, an internal combustion engine, such as a diesel motor, serves as the power source for a generator, which feeds an electric machine. The vehicle is thereby powered solely by the electric motor. The internal combustion engine, on the other hand, is disengaged from the drive wheels and can therefore be driven constantly at a single operating state, i.e. at a specific torque with a constant rotational speed. This power concept is ideal, for example, with busses in urban traffic, driving short distances, whereby ideally it can be adjusted to an operating state, whereby the efficiency of the internal combustion engine is as high as possible, while simultaneously the exhaust emissions, fuel use and noise levels are at a reasonable level. In contrast, the disadvantage is that the efficiency of the power train is limited due to the multiple mechanical-electrical conversions.

In comparison, the parallel hybrid drive train offers, aside from overlapping the drive torque distribution, the option of driving with pure internal combustion engine power or pure electrical motor power through a parallel configuration of the power sources in respect to the power flow. With a parallel hybrid, the internal combustion engine can basically be operated at an optimal torque for the most part through respective loading or support from one or more electric machines, such that the maximum efficiency of the internal combustion engine may be effectively used. The electric support of the internal combustion engine decreases the amount of fuel consumption. Because, whereby for short elevated performance requirements in the so-called boost mode, for example when passing, it is possible to combine the power of the two, the internal combustion engine can be constructed such that it is smaller, lighter, and requires less space without loss to the performance and driving comfort of the vehicle, which additionally reduces emissions and is more economical. The electric machine can also function as an integrated start generator (ISG) for starting the internal combustion engine via a clutch. Furthermore, the electric machine may be used to charge an electric energy storage unit when in the generator mode, and for recuperation. As a rule, any vehicle transmission may be used for variation of gear transmission ratios of the drive train.

Parallel hybrid electric power trains are usually constructed as one-clutch configurations (1K) or two-clutch configurations (2K). An electric machine with an integrated starter generator function (1K-ISG, or respectively, 2K-ISG) can be integrated in both configurations.

In the first construction, as for example is shown in the U.S. 2005 022 1947 A1, the internal combustion engine can be connected to an electric machine by a first clutch. The electric machine can be coupled to a standard transmission by a separate second clutch.

The second construction is shown, for example, in the DE 10 2005 051 382 A1. With this comparatively simple and particularly compact configuration, only one clutch is implemented between the internal combustion engine and the electric machine. A second separate clutch is not used. The clutch can be a friction type clutch or, in the simplest case, as a particularly inexpensive and space saving construction, a dog clutch (positive locking clutch).

As a rule, with a configuration of this sort, the function of an optional second clutch between the electric machine and the output, if said is intended or necessary with the respective operating concept, can be assumed by, for example, transmission-internal, geared clutches and/or geared brakes or an upstream converter lockup clutch already present in automatic transmissions.

Furthermore, it is known that in drive trains from vehicles electric machines may be used as an alternative to conventional friction clutches or to hydrodynamic converters as start-up elements, in order to keep mechanical power losses in the transference of force within the drive train as low as possible.

In addition, it is known that in vehicles with automated transmissions, or automatic transmissions, a creep mode is implemented in order to increase driving comfort and reliability. As a rule, the vehicle rolls thereby in a gearing, whereby the brake and gas pedal are not applied, slightly, or respectively, moves in this driving state at a slow rate, which the driver finds comfortable. On inclines, by using a creep mode of this sort it is also possible to stop the vehicle for a limited period of time, whereby an undesired rolling of the vehicle is avoided. In the creep mode, small obstacles such as curbs can also be overcome.

In the creep mode, a creep torque is transferred from the drive to the output, or respectively, the activated vehicle wheels, which ideally can be adjusted to a predetermined characteristic value or curve. A creep mode which can be regulated is possible with various common operating concepts.

With vehicles having an automated transmission and an automatic friction type starting clutch, the regulation of the creep mode can be accomplished through a respective activation of the starting clutch. With vehicles having an automatic transmission and a hydrodynamic converter, the transferred creep torque is determined for the most part by the idle of the internal combustion engine, or can be regulated thereby.

With hybrid or electric vehicles, an electric machine can be used to generate the creep mode. From the DE 10 2006 003 714 A1, for example, an electrodynamic propulsion system of a vehicle is known, whereby, through an activation of an electric machine as an additional drive unit, a creep driving state, comparable to the creep mode of a vehicle with an automatic stepped transmission and a hydrodynamic converter, can be recreated, whereby an increased level of driving comfort is obtained.

A creep mode by means of an electrodynamic starting element has, as a rule, the advantage over drive trains with a friction clutch, which are operated with slippage in order to establish a creep torque, that there is no danger of clutch overheating and increased clutch wear during longer creep periods.

In order to portray a creep mode, comparable with a vehicle having a hydrodynamic torque converter as starting element, in the already mentioned 1K-ISG configuration of a parallel hybrid drive train with a friction clutch for connecting the internal combustion engine, it seems that a pure electric motor creep using the electric machine would suggest itself, whereby the internal combustion engine is running at idle and the clutch is disengaged, in order that first when the electric energy storage unit, which supplies the electric machine, is almost empty or an overheating of the electric machine is eminent, the selected creep torque be established through the friction clutch in slippage mode.

This however poses the problem that at least when the energy storage unit is empty, the friction clutch must carry the entire force of the creep torque and additionally a generator torque of the electric machine for charging the energy storage unit, and if applicable, for supplying power to an internal power supply network with ancillary components, in order that the creep mode be continued. Due to the relatively high torque which is to be applied to the clutch, there is a great deal of power loss thereby. This may have the result that in the end a creep mode or the initiation of movement must be interrupted, in order to protect the friction clutch from damage, or that the clutch must be larger, and more extensively cooled, in order to obtain uninterrupted creep modes and start up modes of the vehicle, whereby the construction and cost expenditures as well as additional space requirements and disadvantages regarding weight are increased. For these reasons a purely electric motor creep mode, at least when there is the possibility of a comparably long creep period, using a 1K-ISG parallel hybrid drive train of this type is less advantageous.

With this background information, the invention assumes the task of providing a process and a device for controlling a hybrid electric power train which allows for an efficient, to a large degree temporally unlimited and thereby reliable creep mode, whereby furthermore, an electric energy storage unit is taxed as little as possible.

The solution to this task is provided by the characteristics of the independent claims, while advantageous embodiments and developments of the invention may be derived from the subsidiary claims.

The invention acknowledges the fact that with a hybrid vehicle which has an internal combustion engine that can be connected by a friction clutch to a parallel hybrid drive train, and an electric machine, which is located between the internal combustion engine and the output, for ensuring an electric energy reserve in a drive-energy storage unit and to avoid a recharging operation of the electric machine with a high generator torque in a poor degree of efficiency, it is advantageous to obtain a creep mode primarily with the friction clutch, and only to support this creep mode with the electric machine when necessary.

Accordingly, the invention comprises a process for controlling a creep mode of a vehicle with a hybrid electric power train, containing a power train that that is essentially comprised of an internal combustion engine, and electric machine, a clutch element located between the internal combustion engine and the electric machine, a transmission and an output.

A creep mode of a vehicle with an internal combustion engine and a transmission is understood to be the case whereby the vehicle moves forwards for an undetermined period of time at a low speed, when neither the brake nor the gas pedal are activated, such that friction-locked connection between the internal combustion engine and an output that must be accompanied by an engine speed of the internal combustion engine which is lower than the idle speed. The creep mode should also keep the vehicle from rolling backwards on an incline.

To solve the proposed task, the invention provides that with a running internal combustion engine, in order to obtain the creep mode, primarily the clutch element, and secondarily, depending on a monitoring of predetermined operating parameters of the clutch element and/or from the dimensions relevant for the creep mode, the electric machine shall be used.

The proposed task shall also be solved with a device for executing the process.

Accordingly, the invention furthermore comprises a device for controlling a creep mode of a vehicle with a hybrid electric power train, containing a power train that is essentially comprised of an internal combustion engine, an electric machine, a clutch element located between the internal combustion engine and the electric machine, a transmission and an output. In addition, control means and monitoring means are provided through which, by taking into account an acceptable load to the clutch element, a creep torque can be generated primarily through operating the clutch element in a slippage mode and secondarily by operating the electric machine in a creep mode.

The clutch element is advantageously constructed as a friction clutch, the temperature of which can be monitored at least in the creep mode using a control means and a monitoring means, such as a temperature sensor, and the transmission torque, via a torque sensor, can be monitored and regulated.

With the invention, it is advantageously possible to obtain a creep mode with a parallel hybrid vehicle which can be sustained longer or continuously, whereby an electric energy storage unit is taxed less than with known technical solutions, such that already at least a reserve of energy is available for the electric machine and, if applicable, for other components. As a result, during a creep mode, the charging of the energy storage unit at an unfavorable level of generator efficiency and additional load to the clutch can be avoided or delayed.

Accordingly the invention suggests that the creep torque with a running internal combustion engine be generated primarily by the friction clutch, whereby the transmission torque of the clutch in each case corresponds to the desired creep torque.

Furthermore, there are protective measures for the clutch element, or respectively, the clutch, dependent on which the electric machine is implemented for the execution of the creep mode. For this, advantageously, the temperature of the clutch is continuously monitored. Should an overheating of the clutch be imminent in the creep mode, in other words, the temperature threshold level is exceeded or should a creep torque be demanded which exceeds a predetermined maximal acceptable transmission torque threshold level for the clutch, below which the clutch is sufficiently cooled while in slippage mode over an extended period of time, then the protective measures would be applied.

For this it is possible, in order to relieve the clutch element in creep mode, to switch to a pure electric motor creep mode by means of the electric machine, when this is necessary. In this case, the electric machine is activated when the friction clutch is disengaged, such that the selected creep torque is generated at the output. The unencumbered friction clutch is then able to cool down relatively quickly.

It is also possible that the electric machine be activated only for the purpose of providing support. In this case, the selected creep torque is generated collectively by the electric machine and the slipping friction clutch, whereby the clutch taxed to a lesser degree and the energy consumption of the electric machine as well as the thermal load to the electric machine are lower in comparison to a purely electrical creep mode.

Because the clutch temperature is monitored and the electric energy is used as little as possible for purely electric motorized creep modes, the availability of starting capability of the vehicle is ensured, particularly with a creep mode over an extended period of time on an incline.

For clarification of the invention, a drawing of an embodiment example accompanies the description. In said, FIG. 1 shows a schematic representation of a hybrid power train of a vehicle for executing a process in accordance with the invention for controlling a creep mode.

Accordingly, in FIG. 1 a diagram is shown of a vehicle hybrid electric power train 1 with a parallel hybrid drive train 2 as it may be implemented, for example, in a utility vehicle (truck, bus, van or special purpose vehicle). The power train 2 has an internal combustion engine 3, such as a diesel engine with a crank shaft 24, which can be connected to a clutch element 4, ideally in the form of a friction clutch. The electric machine 5 can be coupled to a transmission 7 by a transmission input 6.

The transmission 7 can, as is indicated in FIG. 1, be located in the power train downstream of a power take-off (PTO), which is not explained in greater detail here. A respective output torque of the hybrid power train 1 can be transferred in a conventional manner through an output 26 and a differential 9 to a drive shaft 10 and thereby to the driving wheels 11.

The construction of a drive train 2 of this sort is known to a person skilled in the art. Essential to the invention is a control system in accordance with the invention for said power train 2, in particular the electric machine 5 and the clutch element 4 for obtaining a creep mode.

The electric machine 5 can, depending on the operating situation, function as an electric drive unit or as a generator. For this purpose, it is connected to a converter 12, which can be controlled by a converter control device 13. The electric machine 5 is connected to an electric energy storage unit 14, such as a 340V high voltage battery (Supercaps are also possible) by the converter 12. When used as a motor, the electric machine is supplied with power from the energy storage unit 14. When used as a generator, in other words when the internal combustion engine 3 is being used for drive power and/or in recuperation mode, the energy storage unit 14 is recharged by the electric machine 5. Furthermore, the electric machine 5 functions as an integrated starter generator for starting the internal combustion engine 3.

The high voltage circuit of the energy storage unit 14, or respectively, the control device attached to said, is connected to an internal power supply network (24V or 12V) 16 via a bidirectional DC converter (DC-DC) 15. The energy storage unit 14 can be monitored and regulated by a battery management system (BMS) 17 regarding its state of charge (SOC). The DC converter 15 can be controlled through a DC converter control device 18. In addition, there is also a control device 19 for the brake regulating functions which is not explained in greater detail here, such as an anti-locking brake system (ABS), or respectively an electronic brake system (EBS) and a further control device 20 for an electronic diesel regulator (EDC) for the internal combustion engine 3 in the form of a diesel engine. The individual control devices specified can also, at least in part, be combined in a single control device.

Furthermore, there is an integrated controller 21, in which a transmission control unit (TCU), a hybrid control unit (HCU) and various operating functions are combined. The controller 21 has a means for controlling, in particular a control unit 25 for activating the clutch element 4 in the slippage mode, assigned to it, which can also be integrated in the controller 21. The control unit 25 is designed such that it functions together with the controller 21, which also regulates the operation of the electric machine 5, as is indicated by a double arrow.

A respective drive energy distribution and function control of the individual components of the hybrid power train can be provided through a central strategy unit 22, which, advantageously, is connected to the controller 21 and the control unit 25 as well as other relevant control devices 13, 17, 18, 19 through a data bus (e.g. CAN) 23.

A process in accordance with the invention, which is particularly effectively executable with the hybrid electric power train 1, is based on an energy storage unit friendly creep mode of the vehicle via the clutch element 4.

For this a respectively applied creep torque is applied through a corresponding activation of the friction clutch 4 in slippage mode. Because, from the initiation of the creep mode, the friction clutch 4 is used, and not the electric energy storage unit 14, for the creep mode, a charging of the energy storage unit 14 with a poor degree of generator efficiency with the clutch 4 in slippage mode and with a low engine rate does not occur, such that the clutch 4 is not encumbered by an increased generator torque. Instead, the electric machine 5 is first used, or respectively only used for a continuation of the creep mode, when said is no longer possible via the friction clutch 4.

This operating situation is monitored using a device for determining, or identifying the progression of the clutch temperature, which may contain a temperature sensor 27 and/or a torque sensor. This sensor 27 is connected through a sensor cable to the controller 21 and the control unit 25. When an acceptable load limit has been reached, the electric machine 5 is then operated, as a motor, as a sole drive unit or in combination with the friction clutch 4 through an appropriate activation by the converter control device 13 and an adjustment in regard to this of the converter 12.

In particular, the strategy unit 22 causes thereby, on the one hand the switching of the electric machine 5 between its functions as a generator and a motor via the converter control device 13 and the converter 12, depending on the requirements. On the other hand, the operating strategy unit 22 causes the respective activation of the electric machine 5 and/or the friction clutch 4 for generating and regulating a desired creep torque of the vehicle in combination with the transmission 7.

Reference Symbol List

1 Hybrid electric power train
2 Drive train
3 Internal combustion engine
4 Clutch element
5 Electric machine
6 Transmission input
7 Transmission
8 Power take-off 9 Differential
10 Drive shaft
11 Vehicle wheel
12 Power converter
13 Power converter control device
14 Electric energy storage unit
15 DC converter
16 Internal power supply network
17 Battery management system
18 DC converter control device
19 Electronic brake regulator
20 Electronic diesel regulator
21 Controller
22 Operating strategy unit
23 Data bus
24 Crank shaft
25 Control device
26 Output
27 Temperature sensor; Torque sensor

The invention claimed is:

1. A process for controlling a creep mode of a vehicle with a hybrid electric power train, which has a drive train comprising an internal combustion engine, an electric motor, a clutch element comprising a clutch located between the internal combustion engine and the electric motor and a torque sensor configured to determine a measured torque transmitted by the clutch, and a transmission operatively connected to the electric motor
wherein while the internal combustion engine is running, in order to supply a desired creep torque, primarily the clutch element is utilized, and secondarily, depending on a monitoring of predetermined operating parameters of the clutch element and/or from dimensions relevant for the creep mode, the electric motor is utilized, and
wherein the clutch element is configured to transmit a clutch torque that varies in response to the measured torque, and wherein the transmitted clutch torque does not exceed a maximal threshold value of the measured torque.

2. The process of claim 1, wherein the desired creep torque exceeds the transmitted clutch torque, in order to supply the desired creep torque, the electric motor is connected to generate collectively with the clutch element the desired creep torque.

3. The process of claim 1, wherein the clutch element is configured to transmit no clutch torque, and wherein the electric motor is utilized to generate the desired creep torque.

4. The process of claim 1, wherein the clutch element is configured to vary the transmitted clutch torque in response to a measured temperature of the clutch element, and wherein the transmitted clutch torque is lowered when the measured temperature exceeds a temperature threshold value of the clutch element.

5. The process of claim 1, wherein the maximal threshold value of the measured torque of the clutch element is a previously determined maximal transmitted clutch torque that allows the clutch element to be used in creep mode for an extended period of time.

6. A device for controlling a creep mode of a vehicle with a hybrid electric power train, which has a parallel hybrid drive train comprising:
an internal combustion engine,
an electric motor,
a clutch element comprising a clutch located between the internal combustion engine and the electric motor and a torque sensor configured to determine a measured torque transmitted by the clutch,
a transmission coupled to the electric motor,
a controller operatively connected to the clutch element and the electric motor, and
a monitor configured to monitor the clutch element,
wherein the controller is configured to generate a creep torque primarily by operating the clutch element in a slippage mode and secondarily by operating the electric motor in a creep mode, and
wherein the clutch element is configured to transmit a clutch torque that varies in response to the measured torque, and wherein the transmitted clutch torque does not exceed a maximal threshold value of the measured torque, and
wherein the monitor determines the transmitted clutch torque and the controller regulates the transmitted clutch torque.

7. The device of claim 6, wherein the clutch is a friction clutch.

8. The device of claim 6, wherein the monitor determines the temperature of the clutch element and the controller regulates the transmitted clutch torque in response to the determined temperature of the clutch element.

9. The process of claim 1, wherein the creep torque is generated collectively by utilizing the clutch element in a slippage mode and by utilizing the electric motor.

10. The device of claim 6, wherein the creep torque is generated by utilizing only the electric motor.

* * * * *